W. H. MUZZY.
CASH REGISTER.
APPLICATION FILED OCT. 13, 1905.
1,055,415.
Patented Mar. 11, 1913.
6 SHEETS—SHEET 3.
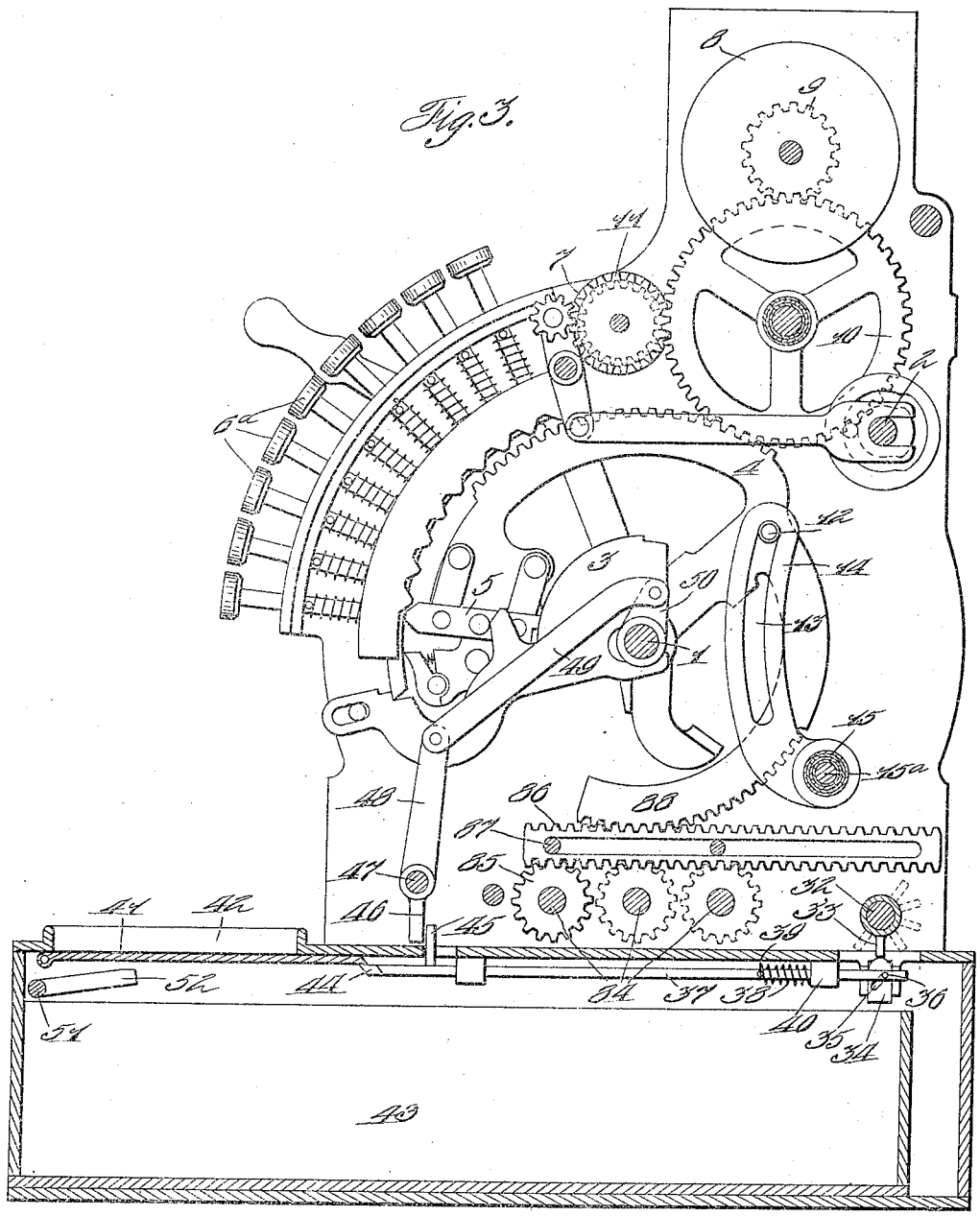

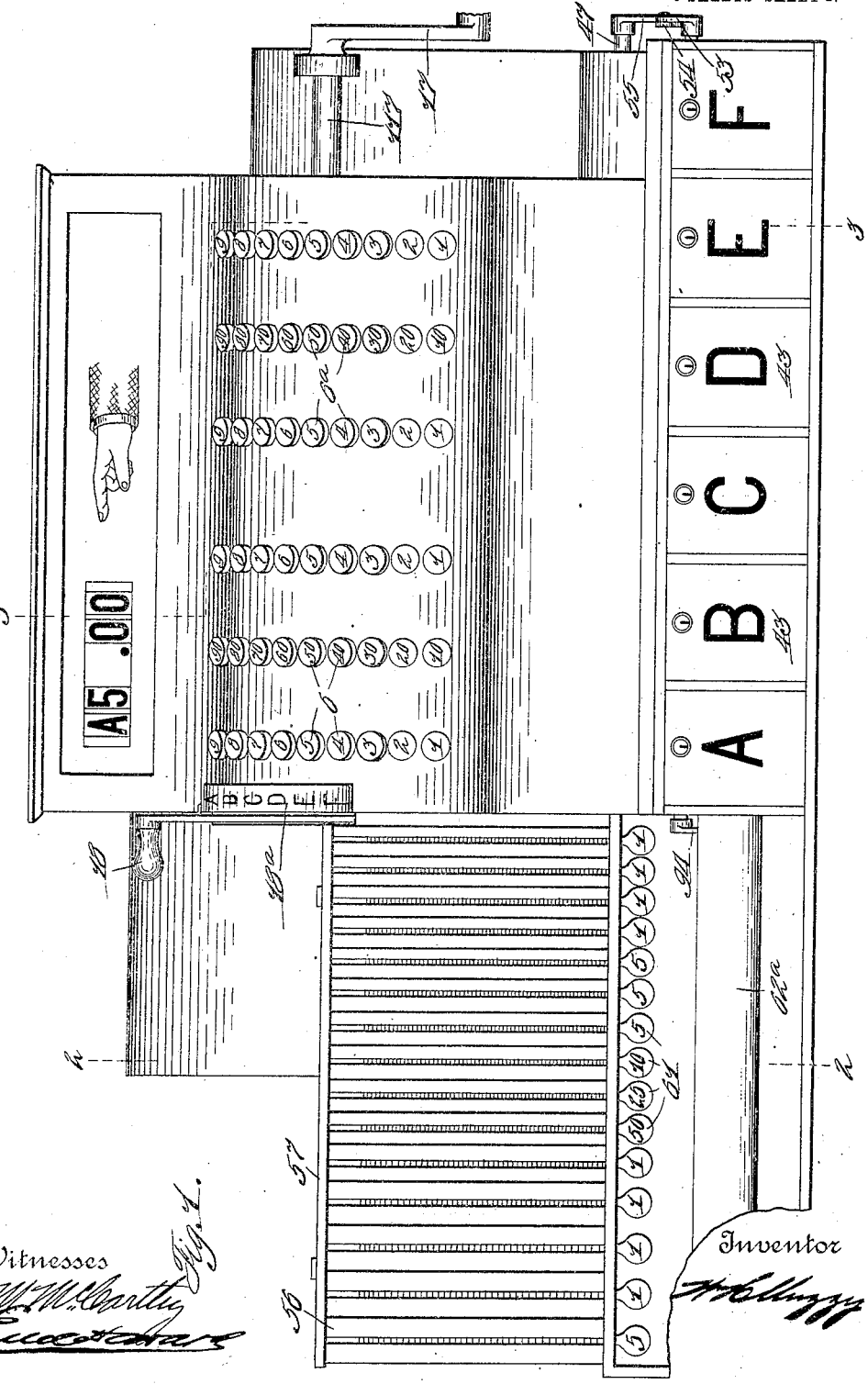

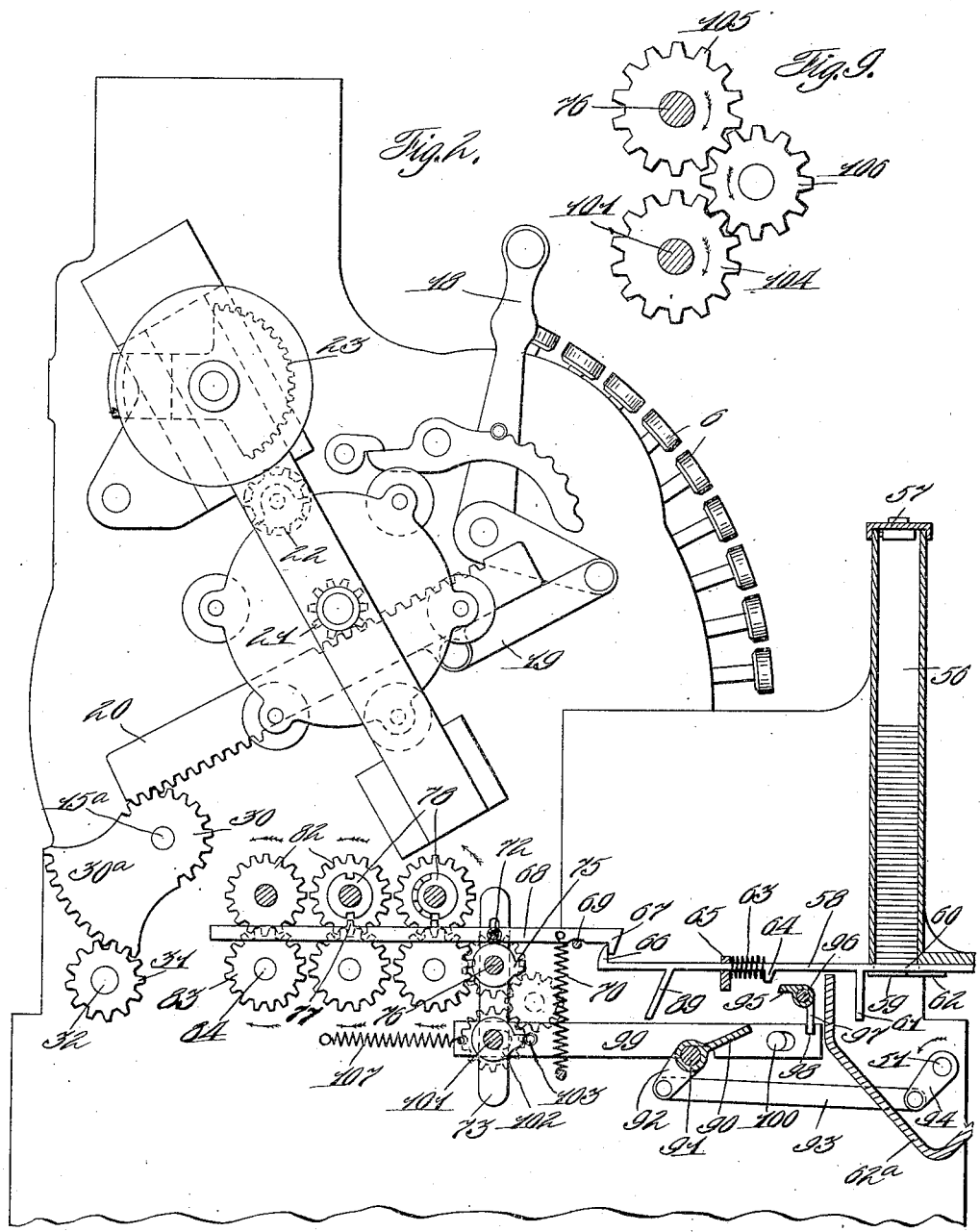

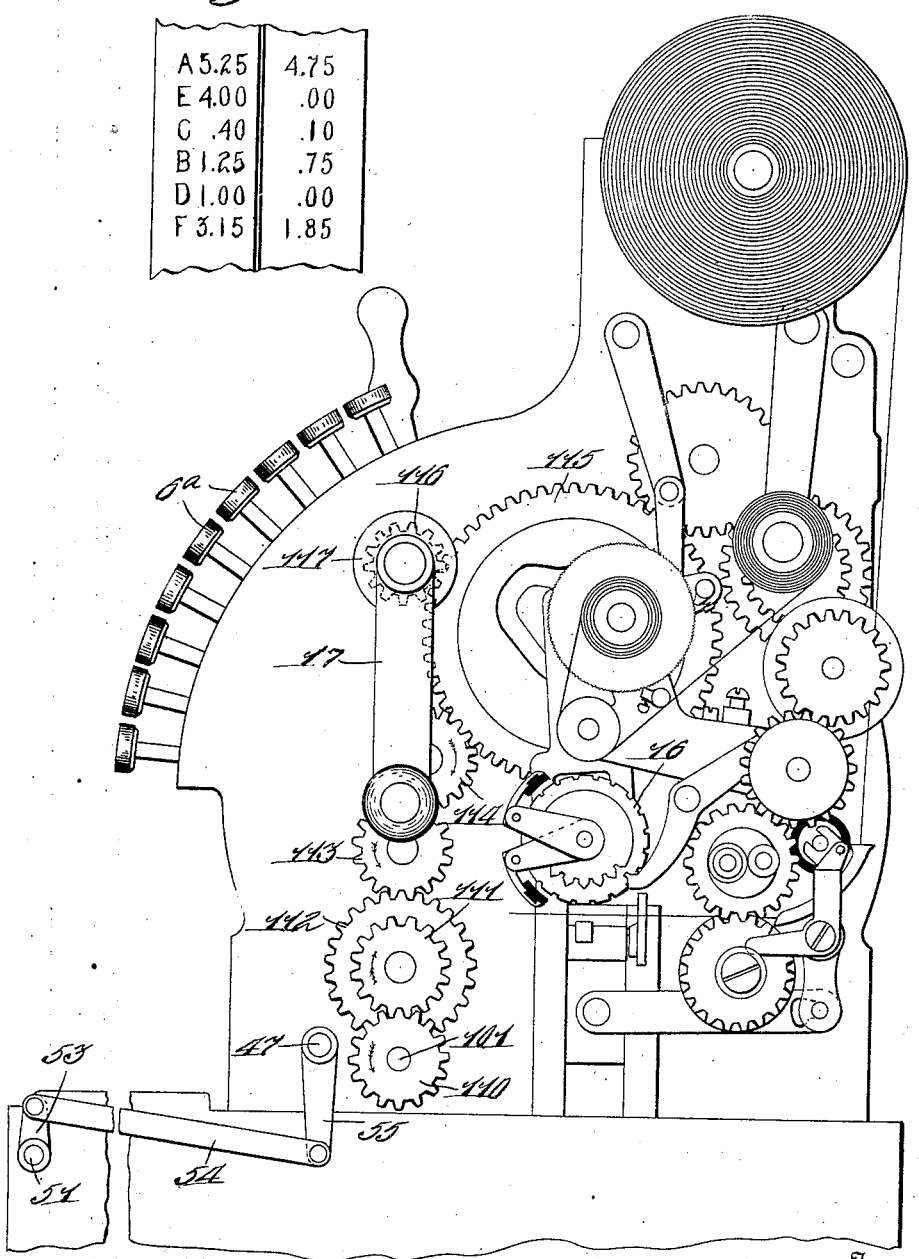

W. H. MUZZY.
CASH REGISTER.
APPLICATION FILED OCT. 13, 1905.
1,055,415.
Patented Mar. 11, 1913.
6 SHEETS—SHEET 5.
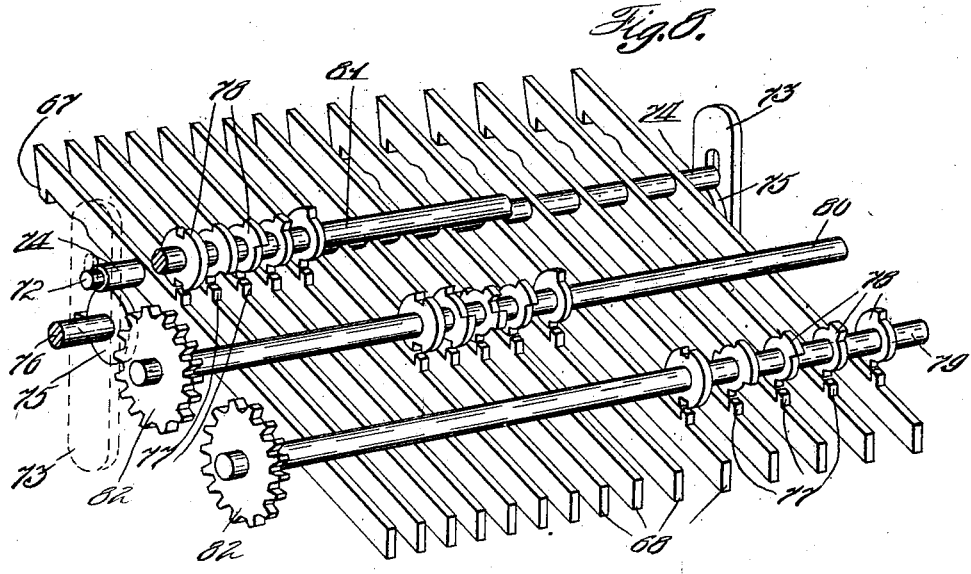
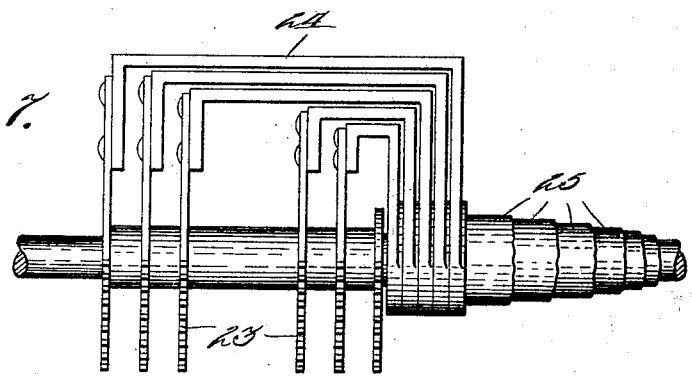
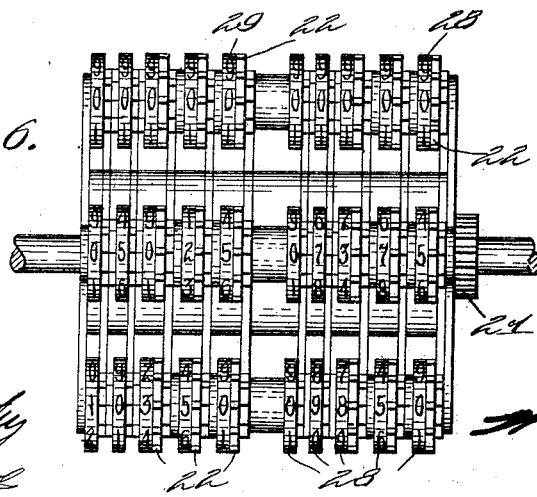
Witnesses
Inventor

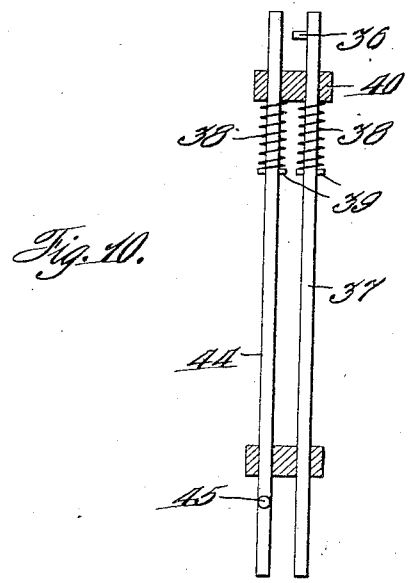
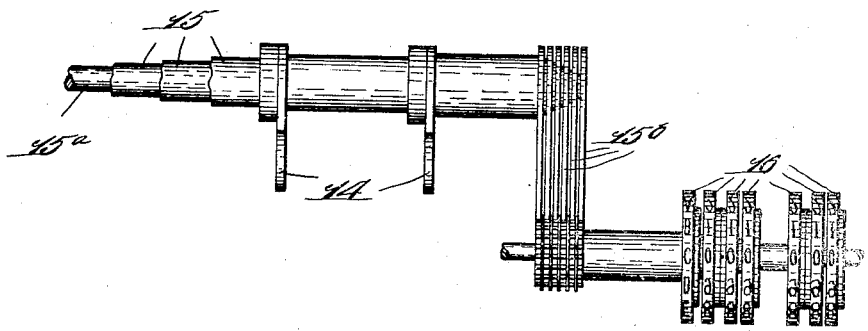

UNITED STATES PATENT OFFICE.

WILLIAM H. MUZZY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,055,415. Specification of Letters Patent. Patented Mar. 11, 1913.

Application filed October 13, 1905. Serial No. 282,613.

*To all whom it may concern:*

Be it known that I, WILLIAM H. MUZZY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to improvements in machines in which independent cash receptacles are provided for the respective clerks for keeping their cash separate and placing the responsibility for mistakes or shortage upon the proper clerks.

One of the several objects of the invention is to provide an improved machine in which the cash received by the different clerks is automatically deposited in their respective cash drawers.

A further object is to provide a machine in which the moneys received by the respective clerks are kept separate, and the necessary change required supplied from an independent source.

A further object of the invention is to provide mechanism for accounting for the amount of money received by the respective clerks, and also for the amount of money paid out in change by said clerks.

This mechanism may be used also for keeping separate accounts of different classes of transactions, such as "Cash Sales" and "Credit Sales," or for accounting for the sales in different departments of a store, such as "Groceries" and "Meats," by different clerks.

With these and incidental objects in view the invention consists in certain novel features of construction and combination of parts, the essential elements of which are set forth in appended claims and a preferred form of embodiment of which is hereinafter specifically described with reference to the drawings which accompany and form part of this specification.

Of said drawings: Figure 1 represents a front elevation, partly broken away, of the machine embodying my invention. Fig. 2 is a vertical section, on line 2—2 of Fig. 1, showing the multiple counters and connections in end elevation. Fig. 3 is a vertical transverse section, through my improved machine, taken on the line 3—3 of Fig. 1.

Fig. 4 is an end elevation of the machine, showing the printing mechanism. Fig. 5 is a detail plan view of a portion of the detail record strip. Fig. 6 is a detail top plan view of the multiple counter reel, or drum. Fig. 7 is a detail front elevation of the actuating segments and connections for the twin series of counters. Fig. 8 is a detail perspective view of the coin ejector latches and controlling mechanism. Fig. 9 is a detail side elevation of the gears connecting the two cam shafts, shown in Fig. 2. Fig. 10 is a detail top plan view of one pair of the latches for the drawer flaps, Fig. 11 is a top plan view of the connections between the operating segments and the printing wheels, and Fig. 12 is an enlarged detail perspective view of the receptacle for paper money.

As a number of the parts shown and described in connection with the present improvements are old and well known in the art, I will not enter into a detailed description of these parts in this specification, but will refer to certain patents which fully illustrate and describe such constructions. For example, the multiple counter mechanism is substantially identical to that shown in the patent of Thomas Carroll, #703,639, issued July 1, 1902; while the printing mechanism and connections are substantially identical to that shown in a patent to Thomas Carroll, #754,049, issued March 8, 1904. Further, a number of the parts shown in the present drawings and relating to the principle of operation of the registering portion of the machine are old and fully described, and shown in the patent to Cleal & Reinhard, dated April 13, 1897. By referring to these three patents mentioned, a clear understanding of the principle of operation of the machine proper, the printing mechanism, and the multiple counter mechanism may be had.

Described in general terms, however, the machine to which I have applied my present improvements may be said to comprise a main oscillatory shaft 1, a rotary shaft 2, driving segments 3, fast to the shaft 1, oscillatory gear sectors 4, loose on shaft 1, coupling latches 5 for coupling the sectors 4 to the segments 3, keys 6 and 6ª for uncoupling these parts, and grand total counting wheels 7, which are operated from the sectors 4, and a number of indicator wheels 8, provided with suitable indicating numbers, and connected by gears 9 and 10 to the sectors 4.

By referring to Fig. 1 it will be seen that I have illustrated a machine including six banks of amount keys. These banks are divided into two groups of three banks each, and the keys of the respective groups represent units of cents, tens of cents, and units of dollars. The left-hand group of keys, comprising the three left-hand banks, are for registering the purchase price, while the right-hand group, comprising the three right-hand banks of keys, are for determining the amount which the machine is to pay out. I will designate the keys of the left-hand group "6," and those of the right-hand group "6a." Each of the operating sectors 4 of the banks represented by the keys 6 is connected through a gear 10 to pinions 11, for effecting the registration of amounts upon the counter 7, substantially as described in the aforesaid patent to Cleal & Reinhard. The segments 4 of the keys 6a, however, are not so connected to the grand total counting mechanism. Each of the sectors 4 is provided with an anti-friction roller 12, which rollers project through elongated slots 13, formed in arms 14, which are fast to the inner ends of a series of nested sleeves 15. These sleeves are connected at their outer ends by segmental racks 15b to a series of printing wheels 16 for printing both upon a detail strip and a check strip the amount of the purchase, and the amount of change withdrawn from the machine and given to the customer, as shown in Fig. 5. As this printing mechanism and its operation by the crank handle 17 are old and fully described in the patent to Carroll #754,049, mentioned, reference will be made to this patent for a more detailed description. While the printing wheels for printing the amounts are controlled by the different banks of keys, the printing wheel for printing the letter or character designating a particular clerk is controlled by a drum setting lever 18, best shown in Fig. 2, and which is pivoted upon the main frame of the machine and connected by link 19 to a reciprocating rack-bar 20, which engages pinion 21, mounted upon the frame carrying the group of duplicate totalizers or accounting mechanisms, and thus sets these counters to bring their operating pinions 22 into the proper positions to be engaged and operated by the operating segments 23, upon the actuation of the machine, substantially as shown and described in the patent to Carroll #703,639, before mentioned. The operating segments 23 are connected by yoke frames 24 to a series of nested sleeves 25, connected to the wheels 10 at their inner ends.

By referring to Fig. 7 the two groups of operating racks 23 will be seen, and by referring to Fig. 6 it will also be seen that the totalizers 29 and 28 upon the reel are intended, respectively, to be engaged and operated by the duplicate sets of segments, and thus register, respectively, the amounts of the sales of the different clerks and the amounts of money paid out in change by the different clerks.

It is to be understood that the different groups of keys 6 and 6a may be used for controlling the entry of different classes of transactions such as "Cash Sales" and "Credit Sales," or the sales in different departments of a store, such as "Groceries" and "Meats," by the different clerks. This is very desirable, as it not only gives the receipts of the different clerks, but also the amount of cash business and the amount of credit business done by or the amount of groceries and meats sold by each clerk.

The rear end of the aforesaid rack-bar 20 meshes with a segment 30, mounted on shaft 15a, which supports sleeves 15 and is connected to the printing wheel for printing the clerks' characters, in the same manner that the sleeves are connected to their respective printing wheels. The segment 30 carries a segment 30a which meshes with a pinion 31, fast to a transverse shaft 32. This shaft is best shown in Fig. 3, and is provided with a series of radial fingers or pins 33, which, when the shaft is rotated, are brought, successively, into engagement with a series of plungers 34, mounted in the main frame, and each of the same formed with an inclined slot 35, into which projects a pin 36. The pins 36 are mounted upon the rear ends of a series of horizontal sliding latch rods 37, suitably mounted in the main frame, and each normally forced forward by a coil spring 38, interposed between a pin 39 on the rod and one of the guiding lugs 40, through which it passes. The forward beveled end of each of the rods 37 is arranged to support a pivoted flap or coin platform 41, mounted beneath an opening 42 formed in the top of the cabinet; there being one of these openings and a corresponding flap for each clerk.

It will be seen from the above that when one of the plungers 34 is depressed its corresponding rod 37 is drawn rearward, as shown in Fig. 3, so that its lower end passes from under its companion platform or flap 41. This platform, upon which the money received has been placed by a clerk, is subsequently released and allowed to deposit the cash within a locked cash drawer 43, located immediately beneath it; there being an independent cash drawer beneath each flap. Each one of the platforms or flaps 41 is further provided with a sliding latch-bar 44, located beside the bar 37, and of substantially the same construction, except that it is not provided with one of the plungers 34. Each bar 44, however, is provided with a vertical arm 45, by means of which the bar is retracted against the tension of its spring to disengage the forward beveled end from its flap 41. The arms 45 are operated upon each operation of the machine by a plate 46, fast to a rock-shaft 47, which latter is actuated by an arm 48 fast thereon, and connected by a link 49 to an arm 50, fast on the shaft 1. (See Fig. 3).

It follows from the above construction that when the lever 18 is operated and a particular one of the fingers 33 brought over its companion plunger 34, that one of the latches 37, pertaining to a particular flap, is withdrawn, but the remaining latch 44 still retains the flap in its elevated position until the handle 17 of the machine is operated to oscillate the shaft 1, which operation results in this second latch 44 being withdrawn from under the flap 41 and permitting the same to fall and discharge the coins or bills resting thereon into its particular cash drawer. The continued operation of the machine causes the latch 44 to resume its normal position, and the flap 41 is thus relatched in an elevated position, even though the latch 37 remains withdrawn, as shown in Fig. 3. The return of the flaps is effected by a rock-shaft 51, carrying a series of arms 52 located immediately beneath the flaps 41. The shaft 51, as best shown in Fig. 4, is provided with an operating arm 53, which is connected by link 54 to an arm 55, fast to the outer end of the rock-shaft 47. When this shaft is oscillated to operate the latches 44, the arms 52 are rocked downward and permit the flaps 41, that have been released, to descend.

At the return of the shaft 1 to normal position it will, as is well known, be rocked beyond normal position and then back thereto. This movement of the shaft 1 will be imparted to the shaft 47 which will in turn give the same degree of movement to the shaft 51 carrying the arms 52 so that the latter will return the released flap or cover 41 to its latched position, after which the arms 52 return to the position shown in Fig. 3.

As the operator is not supposed to make change from the money deposited in his cash drawer 43, I have provided means for causing a series of money tubes 56, mounted in the front of the machine, at one side, to automatically discharge the proper amount of change. These tubes are filled from the top, and are preferably covered with a suitably locked cap or protector 57. The lower ends of the tubes are covered by ejector slides 58 and guard-plates 59. Each of the slides 58 is provided with an aperture 60, of a size corresponding to the coin contained within the tube. This aperture normally registers with the coins in the tube, and is just deep enough to contain one coin, or rather to catch one coin and move it forward when the slide is forced forward by its spring. The coins normally rest upon the guard 59, and this guard is provided with a discharge aperture 62, located to the front of the lower end of the tube. When the slide is moved forward, it carries the coin with it until the coin reaches the aperture 62, when it drops from the slide into an inclined chute 62$^a$. Each of the slides 58 normally tends to move forward under the impulse of a coil spring 63, interposed between the lug 64 on the slide and a stationary cross-bar 65, through which the slide passes. The rear end of the slide is provided with a hook 66, which is engaged by a hook 67, formed on the latch-bar 68 to normally latch the slide in its retracted position. The bar 68 is normally drawn down upon a stop-pin 69 by coil-spring 70, which connects it to the main frame. Each of these latch-bars 68, as best shown in Figs. 2 and 8, is further supported by a transverse shaft 72, guided in vertical slotted guide-plates 73 of the main frame. The ends of the shaft 72 are provided with anti-friction rollers 74 which rest upon cams 75, fast to a transverse rotary shaft 76. Each of the latches 68 is provided with a lug 77; these lugs being arranged to coöperate with cams 78, mounted upon three transverse oscillatory shafts 79, 80 and 81. These shafts carry pinions 82, which mesh with corresponding pinions 83 upon transverse shafts 84. The inner ends of the shafts 84 carry pinions 85, which mesh with horizontally-reciprocating racks 86, supported by cross-bars 87, and which mesh with extensions 88 of the segments 4. By this means the shafts 79, 80 and 81 are adjusted according to the movements of the segments 4, which are controlled by the keys 6$^a$, and thus determine the amount of change released by determining the slides 58, which are released. After one of the shafts 79, 80 or 81 has become set, its cams will be so positioned as to block the vertical movement of one of the lugs 77, and when the shaft 72 is forced upward by the cams 75 upon which it rests, the forward end of the latch-bar is elevated, as the rear end cannot move upward. This movement causes the hook 67 to disengage from the hook 66, allowing the spring 63 to force slide 58 forward.

When no change is to be delivered the rod 69 acts as a fulcrum for the latch bars 68, allowing the cams 75 to raise the lugs 77 into the cut out portion of the cams 78 thereby holding the slides 58 in a retracted position.

As it is desirable to prevent the full operation of the ejecting slides 58 until the operation of the machine is complete, I provide a locking bell-crank plate 95, mounted upon a transverse shaft 96, and provided with a pendent arm 97, which projects into a notch 98, formed in a horizontal slide 99. One end of this slide is supported on a pin 100, while the rear end is supported by a shaft 101. The shaft 101 carries a cam 102, engaging a roller 103 of the slide to normally hold the locking-plate 95 out of the path of the lugs 64. The shaft 101 is connected to shaft 76 by pinions 104 and 105, mounted on said shafts and connected by an intermediate pinion 106, mounted on the frame of the machine. Slide 99 is held against the cam 102 by coil spring 107, which connects it to the main frame. Upon the commencement of the operation of the machine the cam 102 releases slide 99 and permits the spring 107 to move the same rearward, thus drawing the plate 95 into the path of all of the lugs 64, and prevents a full operation of the slides 58. If it were not for this arresting plate 94 it would be possible manually to operate the released ejector slides 58 back and forth while the hook ends 67 of the latch bars 68 were elevated thereby withdrawing all of the change from the tubes 56 corresponding to the released slides 58. As the operation of the machine is completed, the cam 102 again engages the roller 103 and forces the slide 99 forward, to cause the plate 95 to move out of the path of the lug 64 and allow the slides to automatically move forward and eject the coins. Not more than one coin can be extracted from one tube during one operation of the machine, as the return of any of the slides 58 to a position in which it may take hold of the second coin will cause the slide to become latched. After the slide 58 has made any forward movement, it will not again become latched upon the descent of the hook 67, but will remain unlatched until returned to its normal position by the succeeding operation of the machine. This return movement of the slides 58 is effected by arms 89, pendent from the slides in such positions as to be engaged and forced rearward by a plate 90, mounted upon rock-shaft 91, provided with an arm 92 connected by link 93 with a similar arm 94, mounted upon the rock-shaft 51. During the first or return operation of the segments 4 of the machine, the plate 90 returns all of the unlatched slides 58 to their latched positions; the projections 64 riding over and depressing the plate 95. A number of the slides 58 are then released, as before described, and are free to operate to automatically eject the proper amount of coins determined by the keys 6ᵃ which have been previously operated.

Motion is transmitted to the shaft 101 through a pinion 110 secured to the end thereof, as shown in Fig. 4, and meshing with a similar pinion 111, fast to a gear 112, which is journaled on the main frame, and meshes with intermediate pinions 113 and 114, the latter meshing with the master driving gear 115 of the machine. This gear in turn meshes with a pinion 116, fast to a sleeve 117, carried by the crank handle 17. As the handle 17 makes two revolutions for each operation of the machine, I introduce the gear 112 between the pinion 116 and the pinion 110, as this gear has twice the number of teeth of the inter-meshing gear 113, and thus provides for the proper rotation of shaft 101.

It will be seen from the foregoing description that the operator first depresses the keys 6, corresponding to the purchase price. He then depresses the keys 6ᵃ, corresponding to the amount of change desired. He next sets the lever 18 to his initial on an index plate 18ᵃ. This setting of the lever 18 sets up his two counters for the two amounts to be registered thereon, and also sets up the printing wheels to print the two amounts in connection with his letter upon the detail strip; one amount represents the amount of the purchase, and the other the amount of the change given, as clearly shown in Fig. 5. The operation of the crank 17 then causes the two additions to be made, the printing to take place, and at the same time releases the platforms upon which the money received is supported, and allows the same to fall into the cash drawer of that particular clerk, and again closes or elevates the platform. The final operation of the machine also results in automatically ejecting the proper change. The indicators 8 are connected to the clerk's setting lever and the segments 4 controlled by the keys 6, substantially as described in the first-mentioned patent to Carroll.

Should a clerk take in any counterfeit money, it will of course be found at the end of the day, as the cash taken in by him is preserved in his proper cash drawer. There is very little likelihood of the clerk's making mistakes in giving change, and if such mistakes are made the particular transaction upon which he made the mistake is at once apparent by an inspection of the detail strip. For instance, should a sale of twenty-five cents be made by clerk A, and a dollar tendered, the strip should show A. twenty-five cents in the left-hand division and seventy-five cents in the right-hand division. If more than seventy-five cents is shown in the right-hand division, it is known at once that a mistake was made and an excess of change given. Further, the proprietor can tell at once how many times these mistakes in change occur in one day, as he has a printed record of the amount of each sale and the amount of money given in change for each sale. In such sales where an even amount of money is presented which exactly covers the amount of the sale, it is simply necessary to place the money or toss it upon the proper flap 41 and rapidly turn the handle after depressing the proper keys 6, when the money will be deposited and the sale registered.

When balancing the machine at night, the amount found in any one of the cash drawers should equal the sum of the two totals found upon the duplicate counters for that particular clerk. In other words, the amount found in his cash drawer should be the equivalent of the amounts of his sales plus the amounts he has taken from the coin tubes in making change, and these amounts are represented by the totals of the two counters.

By the arrangement outlined above the receipts for the different clerks are kept separate, and at the same time the whole mechanism is contained within a very small space and is easy of access to all of the operators alike, both in placing the coin in the machine and in making change.

The cash drawers 43 are preferably provided with locks, and the keys of these locks are given to the different clerks, so that should it become necessary to secure paper money for change at any time, this money can be taken from the cash drawers. The five-dollar tubes, however, are provided with a series of small metal boxes, (see Fig. 12), in which the five-dollar bills are previously placed. These boxes containing the five-dollar bills are handled in the same way that the coins are handled. It will of course be understood that I can handle any denominations of bills, in substantially the same way that the five-dollar bills are handled, and thus obviate the necessity of opening the cash drawers at any time for making change.

With the present improvements, a sale may be recorded and the proper amount of change ejected from the machine, and the money received placed in the machine, very rapidly, as there is no sorting of the money received, and it is much quicker to depress the change keys than it is to pick the money from the different compartments of a change till. If so desired, the discharge of the coins from the tubes can take place in such manner as to place the coins in a position in which they can be secured by the purchaser, thus compelling the purchaser to come to the machine for change, and assuring an inspection of the indication.

While I prefer to have the coins discharged into a chute, similar to that shown in Figs. 1 and 2, to provide for a more rapid inspection, it will be understood that coins discharged from the several tubes may be directed by suitable chutes into a common receptacle located at a central point, without departing from the spirit of this invention; or the coins may be directed into the hand of the operator under the discharge-spout of the central chute, such structures being old and well known in the art.

It will be understood that any suitable signals or bells for the different clerks may be employed.

If for any reason one of the ejector slides 58 should not act automatically when released, I have provided the same with a pendent plate 61, suitably marked for the denomination of the coin, and which be grasped by the operator and drawn forward to cause the coin to be ejected.

While the form of mechanism here shown and described is admirably adapted to fulfil the objects primarily stated, it is to be understood that it is not desired to confine the invention to one form of embodiment here disclosed, for it is susceptible of embodiment in various forms, all coming within the scope of the claims which follow.

Having thus described my invention, what I claim as new, and desire to secure by Letters Patent, is—

1. The combination with an accounting mechanism, of a change maker, selective means for determining the amount to be paid from the change maker, an accounting mechanism for the change maker, and a common operating means for the two accounting mechanisms and the change maker.

2. The combination with an accounting mechanism for the amounts of purchases, of a second accounting mechanism for the amounts of change, a change maker, selective means for the two accounting mechanisms, and a common operating means for the accounting mechanisms and the change maker.

3. The combination with a series of independent cash receptacles, selective means for said receptacles, a change maker having change-holding devices, and a common actuator for the change maker and cash receptacles.

4. In a machine of the class described, the combination with change delivering mechanism and an accounting mechanism, of keys, connections controlled by said keys for determining the amount of change to be withdrawn from said delivering mechanism, mechanism controlled by said keys for entering the amount of change delivered on said accounting mechanism, and a main operating mechanism connected to drive said delivering and accounting mechanisms.

5. The combination with a change maker, of mechanism for accounting in detail for the amounts of sales made by each clerk, and the amount of money withdrawn by each clerk from the change maker, and a common actuator for the change maker and the accounting mechanism.

6. In a machine of the class described, the combination with a change-maker, of an accounting mechanism having a plurality of counters for keeping separately the sales and the amounts withdrawn from the change-maker by each clerk, and a common operating mechanism for the change-maker, and the accounting mechanism.

7. In a machine of the class described, the combination with a change delivering mechanism, of a series of accounting devices, a plurality of manipulative devices, connections whereby the manipulative devices may operate the accounting devices separately, and means whereby the manipulative devices also control the amounts ejected from the change delivering mechanism.

8. In a machine of the class described, the combination with a change delivering mechanism, of a series of accounting devices, a single set of operating devices into connection with which any of the accounting devices may separately be placed, connections whereby the said operating devices determine the amounts ejected from the change delivering mechanism, and additional accounting devices with means for operating them according to the amounts of sale.

9. The combination with a series of independent cash receptacles, of a change maker, a series of counters for the amounts of sales, a corresponding series of counters for the amounts withdrawn from the change maker, and clerks' selective means for bringing the proper counters into operation, and also setting for operation the proper cash receptacles.

10. The combination with a series of independent cash receptacles, of a change maker, a series of counters, one for each clerk, for registering the amount of sales, a series of counters, one for each clerk, for registering the amounts withdrawn from the change maker, money-depositing devices, one for each of the cash receptacles, and mechanism for actuating the counters, change maker and money-depositing devices.

11. In a machine of the class described, the combination with a change delivering mechanism, of a registering device, a printing mechanism, manipulative devices having connections for operating the printing and the registering mechanisms, and additional connections whereby the manipulative devices determine the amounts ejected from the change delivering mechanism.

12. In a machine of the class described, the combination with change delivering mechanism, of a registering device, a printing mechanism, two sets of manipulative devices, connections from one set whereby the printing mechanism and the registering device are equivalently operated, additional connections from said one set of manipulative devices for determining the amounts to be withdrawn from the change delivering mechanism, and connections from the other set of manipulative devices to elements of the printing mechanism whereby amounts of sale may be printed.

13. The combination with a change-maker, of a printing mechanism, setting devices for causing the printing mechanism to so print the amount of a purchase and the amount of change withdrawn from the change-maker for that transaction, as to identify the amounts one with the other.

14. The combination with a change maker, of a series of independent cash receptacles, means for selecting a desired receptacle, and a printing mechanism and connections, so constructed that the amount of a sale, the amount of change given, and the initial of the clerk making the sale, are printed upon a record strip.

15. The combination with an accounting mechanism, of a series of independent cash receptacles, pivoted platforms covering said receptacles, and means for operating said platforms controlled by the accounting mechanism.

16. The combination with an accounting mechanism, of a series of independent cash receptacles having automatic money-depositing devices, a change maker having change-holding devices, and a common operating means for the accounting mechanism, change maker and money-depositing devices.

17. The combination with a series of setting keys, representing different amounts and arranged in groups, of a movable frame carrying two series of twin totalizing counters, corresponding to the respective groups of keys, connections between the respective groups of keys and their respective counters, and a common actuating mechanism for said connections.

18. The combination with a rotary drum, carrying two independent series of totalizing counters, of two independent groups of keys representing different amounts, key connections for the respective counters, and a common operating means for said connections.

19. The combination with two series of counters, of controlling devices for the same, and a printing mechanism for printing in separate columns, side by side, the amounts registered on the counters at each operation of the machine.

20. The combination with a series of counters pertaining to the several clerks, of a money changer, and means common to the counters and the money changer for registering on the counters the amounts withdrawn by the several clerks from the money changer.

21. The combination with a change maker, of a recording mechanism for recording the amounts withdrawn from the change maker, and means for identifying each amount withdrawn, with the clerk securing the change.

22. The combination with an accounting mechanism having a series of controlling keys, of a change maker, a series of controlling keys for the same located beside the keys of the accounting mechanism, and a common operating means for the accounting mechanism and change maker for effecting an automatic delivery of the change corresponding to the amounts on the keys depressed.

23. The combination with an accounting mechanism, of a change maker having a series of spring-operated coin ejectors, and means for effecting the release of the ejectors upon the operation of the accounting mechanism.

24. The combination with an accounting mechanism, of a money changer, automatic coin-ejecting devices controlled by the accounting mechanism, independent hand-operated means for actuating the coin ejectors and means for positively returning the actuated ejectors.

25. The combination with an accounting mechanism, of a change maker, spring-actuated ejectors for the change maker released by the accounting mechanism, and means for individually actuating the ejectors by hand.

26. An accounting mechanism for keeping separate accounts of different kinds of transactions of different clerks, in combination with an operating means for entering upon the accounting mechanism a plurality of transactions at a single operation of the operating means.

27. A plurality of totalizers for keeping separate accounts of different kinds of transactions of different clerks, and an operating means for actuating a plurality of said totalizers during a single operation of the operating means.

28. In a machine of the class described, the combination with accounting devices for keeping separate accounts of different kinds of transactions of different clerks, and manipulative devices for controlling the entry of a plurality of transactions upon the accounting devices during a single operation of the machine.

29. In a machine of the class described, the combination with a plurality of totalizers for keeping separate accounts of different kinds of transactions of different clerks, and manipulative devices for controlling the entry of a plurality of transactions upon the totalizers during a single operation of the machine.

30. In a machine of the class described, the combination with a plurality of totalizers for keeping separate accounts of different kinds of transactions of different clerks, a recording mechanism including a record strip upon which an itemized statement is entered, and manipulative devices for controlling the entry of several transactions upon the totalizers and record strip during a single operation of the machine.

31. In a machine of the class described, the combination with a plurality of totalizers for keeping separate accounts of different kinds of transactions of different clerks, a recording mechanism including a record strip upon which an itemized statement of the different transactions is entered in different columns, and means for entering several transactions upon the totalizers and record strip during a single operation of the machine.

32. In a machine of the class described, the combination with a change delivering mechanism, including ejectors, of keys for determining the operation of said ejectors, a plurality of counters, operating devices common to said counters, connections whereby actuation of said operating devices is controlled by said keys, and means for bringing any one of said counters into operative relation with said operating devices.

33. In a machine of the class described, the combination with a change delivering mechanism including ejectors, of keys for determining the operation of said ejectors, a plurality of counters, operating devices for said counters and common thereto, connections whereby actuation of said operating devices is controlled by said keys, manipulative means for bringing any desired counter into operative relation with said operating devices, and a main actuator with connections whereby said actuator causes operation of said ejectors and said counter operating devices.

34. In a machine of the class described, the combination with differentially movable denominational elements, of groups of graded determining devices, one group for each denominational element and controlled thereby, coin holding devices and spring driven ejectors therefor, and latches for said ejectors, with means controlled by said graded elements for withdrawing said latches from said ejectors.

35. In a machine of the class described, the combination with differentially movable denominational elements, of groups of graded determining devices, one group for each denominational element and controlled thereby, said graded elements comprising disks having helically positioned graduated parts, coin holding devices, spring drawn ejectors therefor, and latches for said ejectors with means for forcing said latches into contact with the graduated parts of said graded elements.

36. In a machine of the class described, the combination with totalizers upon which are entered the amounts purchased and the amounts returned in change, of an operating mechanism for entering the different amounts upon said totalizers, a change maker, and means controlled by the operating mechanism for ejecting from the change maker amounts corresponding to the amounts entered upon the change totalizer.

37. In a machine of the class described, the combination with totalizers upon which are entered the amounts purchased and the amounts returned in change, of an operating mechanism for entering the different amounts simultaneously upon said totalizers, a change maker, and means controlled by the operating mechanism for placing the change maker in condition to permit the withdrawal of change corresponding to the amount last entered upon the change totalizer.

38. In a machine of the class described, the combination with a plurality of totalizers, of means for simultaneously entering thereupon amounts of various transactions, a change maker, and mechanism controlled by the entering means for ejecting from the change maker amounts corresponding to amounts entered upon one of the totalizers.

39. In a machine of the class described, the combination with a plurality of totalizers upon which are entered amounts of various transactions, of manipulative devices for determining the amounts to be entered, means common to the totalizers for entering thereupon amounts determined by the manipulative devices, a change maker, and mechanism controlled by the entering means for ejecting from the change maker amounts corresponding to those entered upon one of the totalizers.

40. In a machine of the class described, the combination with change ejecting devices, of means normally latching same from operation, mechanism for operating the latching means, manipulative devices for determining which ejecting devices are to be unlatched, means for operating the unlatched ejecting devices, mechanism for arresting the unlatched ejecting devices in a partially operated condition, and means for operating the arresting mechanism to permit the complete operation of the released ejecting devices.

41. In a machine of the class described, the combination with change ejecting devices, of operating means therefor, a normally inoperative mechanism for arresting said ejecting devices, and means for moving the said mechanism into operative position to arrest the ejecting devices in a partially operated condition and then withdrawing said arresting mechanism to permit the complete operation of said devices.

42. In a machine of the class described, the combination with change ejecting devices, of operating springs therefor, means for positively returning said ejecting devices against the tension of their springs, a normally inoperative mechanism for arresting the ejecting devices in a partially operated condition, and means to move the arresting mechanism into operative position, then to withdraw said arresting mechanism to permit the complete operation of the ejecting devices, and finally to operate the means for returning the ejecting devices.

43. In a machine of the class described, the combination with a plurality of totalizers, of an operating mechanism common to all of said totalizers, a plurality of cash receptacles corresponding in number to the totalizers, a pair of latches for each receptacle, a manipulative device for bringing any desired totalizer and the operating mechanism into coöperative relation, and operating one of the latches of the corresponding cash receptacle, and means for operating the other latch of said receptacle upon the operation of the operating mechanism.

44. In a machine of the class described, the combination with a plurality of totalizers, of an operating mechanism common to all of said totalizers, a plurality of cash receptacles corresponding in number to the totalizers, a pivoted cover for each receptacle, a pair of latches for each cover, a manipulative device for bringing any desired totalizer and the operating mechanism into coöperative relation, and operating one of the latches of the corresponding cash receptacle cover, and means to operate the other latch of the cover and thereby permit the dropping by gravity of the pivoted cover of the selected receptacle, and finally positively to restore the released cover upon the operation of the operating mechanism.

45. In a machine of the class described, the combination with a plurality of groups of totalizers, of an operating mechanism common to all of said totalizers, a plurality of cash receptacles corresponding in number to the groups of totalizers, means for bringing any group of totalizers and the operating mechanism into coöperative relation, and preparing for opening the corresponding cash receptacle, and means for opening the selected receptacle during the operation of the selected group of totalizers.

46. In a machine of the class described, the combination with a totalizer upon which is accumulated the total amount of sales, of a second totalizer upon which is accumulated the total amount of change, manipulative devices for determining the amounts accumulated upon both of the totalizers, and an operating mechanism common to said totalizers for entering thereupon during a single operation the amounts determined by the manipulative devices operated.

47. In a machine of the class described, the combination with a totalizer upon which is accumulated the total amount of sales, of a second totalizer upon which is accumulated the total amount of change, mechanism for recording each amount entered in the totalizers, manipulative devices for determining the amounts accumulated upon both of the totalizers, and an operating mechanism common to said totalizers and the recording mechanism for entering upon the totalizers and the recording mechanism during a single operation the amounts determined by the manipulative devices operated.

48. In a machine of the class described, the combination with a totalizer upon which is accumulated the total amount of sales, of a second totalizer upon which is accumulated the total amount of change, mechanism for delivering change, manipulative devices for determining the amounts accumulated upon both totalizers, and an operating mechanism common to said totalizers and change delivering mechanism for controlling the actuation of the totalizers an extent commensurate with the manipulative devices operated and for controlling the delivering of change corresponding to the amount entered upon the change totalizer.

49. In a machine of the class described, the combination with a cash receptacle and means normally rendering said receptacle inaccessible, of a main operating mechanism for the machine, connections from said main operating mechanism controlling the means for rendering the receptacle inaccessible, a latch for said receptacle, and a manipulative device controlling said latch, and a spring for restoring said latch to latching position.

50. In a machine of the class described, the combination with a plurality of normally inaccessible cash receptacles, of means for predetermining which receptacle is to be rendered accessible, an operating mechanism, and means controlled by the said mechanism for rendering the predetermined receptacle accessible and then rendering it inaccessible.

In testimony whereof I affix my signature, in the presence of two witnesses.

WILLIAM H. MUZZY.

Witnesses:
 EARLE C. HOWARD,
 WILLIAM O. HENDERSON.